United States Patent
Ohara

(10) Patent No.: US 10,078,475 B2
(45) Date of Patent: *Sep. 18, 2018

(54) PRINTER AND SERVER

(71) Applicant: Brother Kogyo Kabushiki Kaisha, Nagoya-shi, Aichi-ken (JP)

(72) Inventor: Kiyotaka Ohara, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/391,215

(22) Filed: Dec. 27, 2016

(65) Prior Publication Data
US 2017/0109106 A1    Apr. 20, 2017

Related U.S. Application Data

(63) Continuation of application No. 14/828,407, filed on Aug. 17, 2015, now Pat. No. 9,542,146, which is a (Continued)

(30) Foreign Application Priority Data

Mar. 30, 2010 (JP) .................................. 2010-077450

(51) Int. Cl.
*G06F 3/12* (2006.01)
(52) U.S. Cl.
CPC .......... *G06F 3/1228* (2013.01); *G06F 3/1205* (2013.01); *G06F 3/1232* (2013.01); *G06F 3/1247* (2013.01); *G06F 3/1288* (2013.01)
(58) Field of Classification Search
None
See application file for complete search history.

(56) References Cited

U.S. PATENT DOCUMENTS 6,636,891 B1  10/2003 LeClair et al.
6,748,471 B1 *  6/2004 Keeney ................ G06F 3/1204
                                                          358/1.15
(Continued)

FOREIGN PATENT DOCUMENTS

JP    2001-216242 A    8/2001
JP    2002-073462 A    3/2002
(Continued)

OTHER PUBLICATIONS

Japan Patent Office, Notification of Reasons for Rejection for Japanese Patent Application No. 2010-077450 related to co-pending U.S. Appl. No. 13/962,936), dated Jul. 10, 2012.
(Continued)

*Primary Examiner* — Helen Zong
(74) *Attorney, Agent, or Firm* — Baker Botts L.L.P.

(57) ABSTRACT

One of a plurality of setting screens corresponding to a plurality of printers may be generated based on original data stored in a server. Each of the plurality of setting screens may be for permitting designation of a content of each setting item matching a print condition that a corresponding printer is capable of performing. The server may acquire specific printer identification information for identifying a specific printer from a terminal device, store target data of a print target and supply specific data, which is for representing a specific setting screen corresponding to the specific printer, to the terminal device. The server may acquire setting information indicating a designated content of each setting item designated via the specific setting screen and supply to the specific printer print data according to the target data and the designated content of the each setting item indicated by the setting information.

22 Claims, 8 Drawing Sheets

Related U.S. Application Data continuation of application No. 13/962,936, filed on Aug. 8, 2013, now Pat. No. 9,152,368, which is a continuation of application No. 13/072,744, filed on Mar. 27, 2011, now Pat. No. 8,531,691.

(56) References Cited

U.S. PATENT DOCUMENTS

| | | | |
|---|---|---|---|
| 6,757,070 | B1 | 6/2004 | Lin et al. |
| 7,324,233 | B2 * | 1/2008 | Shima .................. G06F 21/608 358/1.1 |
| 7,437,436 | B2 * | 10/2008 | Higuchi .................. H04L 29/06 358/1.1 |
| 2001/0029551 | A1 | 10/2001 | Higuchi |
| 2002/0024686 | A1 | 2/2002 | Uchiyama et al. |
| 2002/0051197 | A1 | 5/2002 | Minegishi |
| 2003/0184782 | A1 | 10/2003 | Perkins et al. |
| 2004/0054962 | A1 | 3/2004 | Shima et al. |
| 2004/0169884 | A1 | 9/2004 | Yamada et al. |
| 2004/0196486 | A1 | 10/2004 | Uchino |
| 2004/0196491 | A1 | 10/2004 | Uchino |
| 2004/0212824 | A1 | 10/2004 | Ohara |
| 2005/0024667 | A1 | 2/2005 | Ishibashi et al. |
| 2005/0024671 | A1 | 2/2005 | Abe |
| 2005/0036491 | A1 | 2/2005 | Ogawa et al. |
| 2005/0157315 | A1 | 7/2005 | Kato |
| 2006/0028679 | A1 | 2/2006 | Uchiyama et al. |
| 2006/0028680 | A1 | 2/2006 | Uchiyama et al. |
| 2007/0081186 | A1 | 4/2007 | Numata |
| 2007/0188791 | A1 | 8/2007 | Utsunomiya et al. |
| 2007/0247664 | A1 * | 10/2007 | Yamamoto ............ G06F 3/1203 358/1.16 |
| 2008/0068649 | A1 | 3/2008 | Emori |
| 2008/0246988 | A1 | 10/2008 | Ashton |
| 2009/0021776 | A1 | 1/2009 | Dolan et al. |
| 2009/0059273 | A1 | 3/2009 | Tomita |
| 2009/0059275 | A1 | 3/2009 | Tomita |
| 2009/0086270 | A1 | 4/2009 | Miyazawa |
| 2009/0091775 | A1 | 4/2009 | Yoshida |
| 2009/0201539 | A1 | 8/2009 | Sawayanagi et al. |
| 2009/0201547 | A1 | 8/2009 | Noguchi et al. |
| 2010/0171982 | A1 | 7/2010 | Sato |
| 2010/0208298 | A1 | 8/2010 | Kitagata |
| 2010/0220347 | A1 | 9/2010 | Oeters et al. |
| 2010/0225966 | A1 | 9/2010 | Bailey et al. |
| 2010/0253975 | A1 | 10/2010 | Ida et al. |
| 2011/0176162 | A1 | 7/2011 | Kamath et al. |
| 2011/0261405 | A1 * | 10/2011 | Ito .................. G06F 1/3203 358/1.15 |
| 2012/0120452 | A1 | 5/2012 | Utsunomiya et al. |

FOREIGN PATENT DOCUMENTS

| | | |
|---|---|---|
| JP | 2002-127559 A | 5/2002 |
| JP | 2002-229749 A | 8/2002 |
| JP | 2002-318677 A | 10/2002 |
| JP | 2003-091401 A | 3/2003 |
| JP | 2004-078554 A | 3/2004 |
| JP | 2004-310757 A | 11/2004 |
| JP | 2004-310758 A | 11/2004 |
| JP | 2005-173725 A | 6/2005 |
| JP | 2005-235035 A | 9/2005 |
| JP | 2007-026079 A | 2/2007 |
| JP | 2007-105937 A | 4/2007 |
| JP | 2007-216477 A | 8/2007 |
| JP | 2007-317169 A | 12/2007 |
| JP | 2008-085726 A | 4/2008 |
| JP | 2008-152545 A | 7/2008 |
| JP | 2009-054005 A | 3/2009 |

OTHER PUBLICATIONS

Japan Patent Office, Decision of Rejection for Japanese Patent Application No. 2010-077450 (related to co-pending U.S. Appl. No. 13/962,936), dated Nov. 6, 2012.
European Patent Office, European Search Report for European Patent Application No. 11159868.6 (related to co-pending U.S. Appl. No. 13/962,936), dated Apr. 24, 2013.
The State Intellectual Property Office of the People's Republic of China, Notification of First Office Action for Chinese Patent Application No. 201110083697.X (related to co-pending U.S. Appl. No. 13/962,936), dated Jun. 4, 2013.
The State Intellectual Property Office of the People's Republic of China, Notification of the Second Office Action for Chinese Patent Application No. 201110083697.X (related to co-pending U.S. Appl. No. 13/962,936), dated Jan. 24, 2014.
Japan Patent Office, Notification of Reasons for Rejection for Japanese Patent Application No. 2013-020504 (related to co-pending U.S. Appl. No. 13/962,936), dated Feb. 4, 2014.
Japan Patent Office, Notification of Reason for Rejection for Japanese Patent Application No. 2013-020504 (related to co-pending U.S. Appl. No. 13/962,936), dated Sep. 24, 2014.
European Patent Office, Communication pursuant to Article 94(3) EPC issued for related European Patent Application No. EP 11159868. 6, dated Aug. 25, 2016.
Japan Patent Office, Notification of Reasons for Rejection issued for Japanese Patent Application No. 2015-098097, dated Apr. 26, 2016.
Japan Patent Office; Notification of Reasons for Rejection for Japanese Patent Application No. 2016-226533, dated Jul. 18, 2017.
European Patent Office; Communication under Rule 115(1)—Summons to Attend Oral Proceedings issued for EP Patent Application No. 11159868.6 (foreign counterpart to above-captioned patent application), dated Apr. 3, 2018.

* cited by examiner

FIG. 2

110 — Model Name: AAA

| Item | Option | Content |
|---|---|---|
| Color | NO | Color, Monochrome |
| Resolution | NO | 300dpi, 600dpi, 1200dpi |
| Document Direction | NO | Landscape, Portrait |
| Both-Side Printing | YES | One side, Long Side Binding, One side Binding, |
| Stapler | YES | ON, OFF |
| Paper Size | NO | LETTER, A4, B4 |
| Interpretable Data Format | | PostScript |
| Layout Data | | 1 |

- 112: Model Name: AAA
- 114: Item
- 116: Option
- 118: Content
- 120: Model Print Condition Information
- 122: Interpretable Data Format
- 124: Layout Data

130 — Model Name: BBB

| Item | Option | Content |
|---|---|---|
| Color | NO | Monochrome |
| Resolution | NO | 300dpi, 1200dpi |
| Document Direction | NO | Landscape, Portrait |
| Paper Size | NO | LETTER, A4 |
| Interpretable Data Format | | PostScript |
| Layout Data | | 2 |

- 132: Model Name: BBB
- 140: Model Print Condition Information
- 142: Interpretable Data Format
- 144: Layout Data

FIG. 3

| | | 210 |
| | Printer ID: PRI90 | |
| 212 | Printer ID: PRI80 | |
| Printer ID: PRI70  214  216 | | |

| Item | Content |
|---|---|
| Printer Model Name | AAA |
| Both-Side Printing | Available |
| Stapler | Not Available |
| Color | Color, Monochrome |
| Paper Size | A4, LETTER |
| Number of Remaining Paper | A4 Available, LETTER Available |
| Color | Color |
| Resolution | 300dpi |
| Both-Side Printing | Long Side Binding |
| Paper Size | A4 |
| Document Direction | Portrait |

Latest Print Condition Information 218

Default Print Condition Information 220

FIG. 4

Layout Data : 1 — 310

| Field Data | | Position Data |
|---|---|---|
| Character String of Item | Box Type | Position Data |
| Print Copy | Number Selection | First Line |
| Color | Character Strings Selection | Second Line |
| Resolution | Character Strings Selection | Third Line |
| Both-Side Printing | Character Strings Selection | Fourth Line |
| Stapler | Character Strings Selection | Fifth Line |
| Paper Size | Character Strings Selection | Sixth Line |
| Document Direction | Character Strings Selection | Seventh Line |

Layout Data : 2 — 330

| Field Data | | Position Data |
|---|---|---|
| Character String of Item | Box Type | Position Data |
| Print Copy | Number Selection | First Line |
| Resolution | Character Strings Selection | Second Line |
| Paper Size | Character Strings Selection | Third Line |
| Document Direction | Character Strings Selection | Fourth Line |

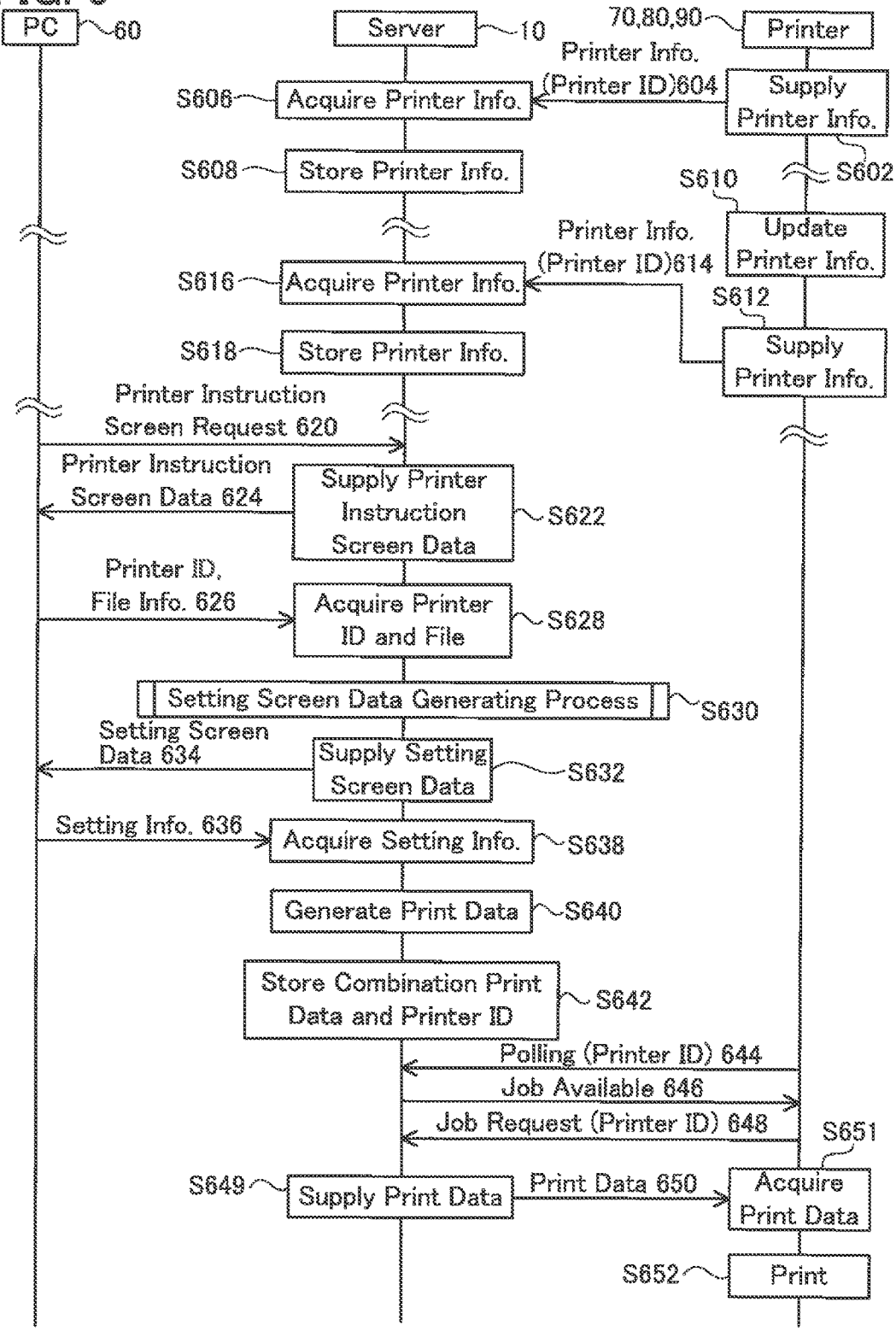

PRINTER AND SERVER

CROSS-REFERENCE TO RELATED APPLICATIONS

The present application is a continuation of U.S. patent application Ser. No. 14/828,407, filed on Aug. 17, 2015, which is a continuation of U.S. patent application Ser. No. 13/962,936, filed on Aug. 8, 2013, now U.S. Pat. No. 9,152,368 B2, issued on Oct. 6, 2015, which is a continuation of U.S. patent application Ser. No. 13/072,744, filed on Mar. 27, 2011, now U.S. Pat. No. 8,531,691 B2, issued on Sep. 10, 2013, which claims priority from Japanese Patent Application No. 2010-077450, filed on Mar. 30, 2010, the disclosures of each of which are incorporated herein by reference in their entirety.

TECHNICAL FIELD

The present specification discloses a server configured to be connected with a terminal device and a plurality of printers of which available print conditions are different from one another.

DESCRIPTION OF RELATED ART

There is a print server which is connected to a terminal device and a plurality of printers. According to this print server, a user designates an IP address of a specific printer and a specific content for causing the specific printer to perform printing. The terminal device sends the IP address of the specific printer and the specific content to the print server. The print server generates print data, having a format in which the specific printer interprets the print data, by using the specific content. The print server sends the print data to the specific printer. The specific printer carries out printing in accordance with the print data. According to the art described above, the terminal device is able to cause the specific printer to perform print without a printer driver for generating print data.

SUMMARY

The art disclosed in the present specification is a server configured to be connected with a terminal device and a plurality of printers via the Internet. This server comprises a memory controlling unit, an identification information acquiring unit, a target data acquiring unit, an image data supplying unit, a setting information acquiring unit, a print data generating unit and a print data supplying unit. The memory controlling unit may be configured to store original data in a memory. One of a plurality of setting screens corresponding to the plurality of printers may be generated based on the original data. Each of the plurality of setting screens may be for permitting the user to designate a content of each setting item matching a print condition that a corresponding printer is capable of performing. The identification information acquiring unit may be configured to acquire specific printer identification information from the terminal device. The specific printer identification information may be for identifying a specific printer in the plurality of printers. The target data storing unit may be configured to store target data of printing. The specific data supplying unit may be configured to supply specific data to the terminal device based on the original data. The specific data may be for representing a specific setting screen corresponding to the specific printer identified by the acquired specific printer identification information. The setting information acquiring unit may be configured to acquire, from the terminal device, setting information indicating a designated content of each setting item designated by the user via the specific setting screen. The print data supplying unit may be configured to supply to the specific printer print data according to the target data and the designated content of the each setting item indicated by the setting information.

The present specification also discloses a printer which is configured to connect with the server. This printer may comprise a latest print condition information supplying unit, a print data acquiring unit, and a print performing unit. The latest print condition information supplying unit may be configured to supply to the server the printer identification information of the printer and latest print condition information indicating a latest print condition that the printer is capable of performing when the printer turns on. Furthermore, the latest print condition information supplying unit may be configured to supply to the server, when the latest print condition of the printer is changed, the printer identification information of the printer and new latest print condition information indicating a changed latest print condition. The print data acquiring unit may be configured to acquire print data from the server. The print performing unit may be configured to perform printing using the print data.

A control method and a computer program for realizing the server described above, and a non-transitory computer-readable storage medium which stores the computer program, are also novel and useful. Furthermore, a control method and a computer program for achieving the printer described above, and a non-transitory computer-readable storage medium which stores the computer program, are also novel and useful. Furthermore, a network system comprising the server and the plurality of printers is novel and useful.

BRIEF DESCRIPTION OF THE DRAWINGS

FIG. 2 shows one example of model information.
FIG. 3 shows one example of printer information.
FIG. 4 shows one example of layout data.
FIG. 5 shows a sequence diagram of processing performed by each device of the network system.

EMBODIMENT

Figure 1:
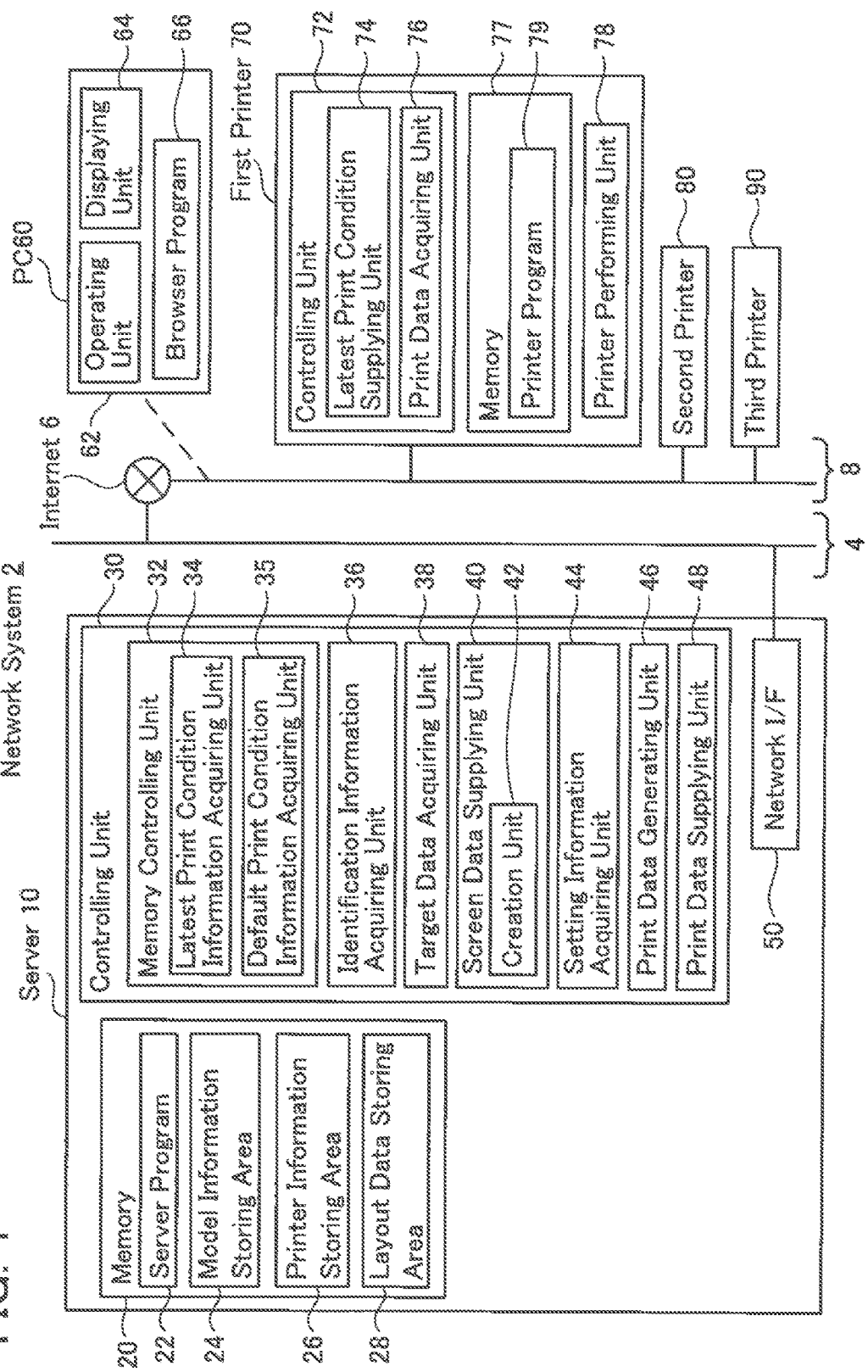
FIG. 1 shows a configuration of a network system.

An embodiment is described herein with reference to the drawings. As shown in FIG. 1, the network system 2 comprises a server 10, a PC 60, and a plurality of printers 70, 80 and 90. The server 10 is connected to a LAN 4. The PC 60 may be portable. The PC 60 is connected temporarily to a LAN 8 different from the LAN 4. The PC 60 connects communicably with the server 10 via the LANs 4 and 8, and the Internet 6. The first printer 70, the second printer 80 and the third printer 90 are connected to the LAN 8. The printers 70, 80 and 90 are connected communicably with the server 10 via the LANs 4 and 8, and the Internet 6. The printer ID of the first printer 70 is "PRI70", the printer ID of the second printer 80 is "PRI80" and the printer ID of the third printer is "PRI90".

(Configuration of Server)

The server 10 comprises a memory 20, a controlling unit 30, and a network interface 50. The controlling unit 30 performs various processes in accordance with a server program 22 stored in the memory 20. By means of the controlling unit 30 performing processes in accordance with the server program 22, the controlling unit 30 functions as a memory controlling unit 32, an identification information acquiring unit 36, an target data acquiring unit 38, a screen data supplying unit 40, a setting information acquiring unit 44, a print data generating unit 46 and a print data supplying unit 48. The memory controlling unit 32 comprises a latest print condition information acquiring unit 34 and a default print condition information acquiring unit 35. The screen data supplying unit 40 comprises a creation unit 42.

The memory 20 stores a server program 22 performed by the controlling unit 30. The memory 20 comprises a model information storing area 24, a printer information storing area 26, and a layout data storing area 28.

The model information storing area 24 stores a plurality of model information 110, 130 (see FIG. 2). Each one of the model information 110, 130 corresponds to each one model of printer. The storage controlling unit 32 acquires the model information of respective models from servers of manufacturers of respective models of printers via the Internet 6, and stores the model information in the model information storing area 24. Alternatively, the storage controlling unit 32 may acquire model information from media storing model information of respective models, and stores the model information of the respective models in the model information storing area 24. As a further alternative, the storage controlling unit 32 may acquire model information of respective models from the printers 70 to 90, and stores the model information of the respective models in the model information storing area 24.

(Content of Model Information)

As shown in FIG. 2, information relating to a printer with a model name 112 of "AAA" is registered in the model information 110. The information registered in the model information 110 includes model print condition information 120, interpretable data format information 122 and layout data information 124. The model print condition information 120 indicates a print condition available in the model "AAA". An item 114, option 116 and content 118 are associated in the model print condition information 120.

In the model print condition information 120, "YES" in option 116 is associated with "stapler" in item 114. This means that equipment for performing a stapler function after printing with a stapler can be set to the printer model "AAA". That is, it means that the stapler function may be available in some printers with model "AAA", and the stapler function may not be available in some other printers with model "AAA. Furthermore, the content 118 indicates the content of each setting item of the print condition available in the printer model "AAA", and signifies the option which can be selected by the user. For example, "ON, OFF" in the content 118 associated with "stapler" means that the use may select an "ON" option for activating the stapler function, or "OFF" option for inactivate the stapler function. As described in detail below, the options selectable by the user indicated in the content 118 may vary according to the current status of the individual printer 70.

"YES" in option 116 is associated with an item which varies between available and not available in each individual printer, similar to the stapler function described above. For example, "YES" in option 116 is also associated with "both-side printing" in item 114. This means that equipment for both-side printing can be installed in the printer model "AAA". Furthermore, item of "one side, long side binding, one side binding" associated with "both-side printing" means those various methods for the both-side printing are available options selectable by the user.

Items 114 associated with "NO" in option 116 (namely, the items "color", "resolution", "document direction" and "paper size") can be performed by a printer model "AAA" without special equipment for the printer. "color, monochrome" associated with "color" means that color printing and monochrome printing are available options selectable by the user. Similarly, "300 dpi, 600 dpi, 1200 dpi" associated with "resolution" means that printing at 300 dpi, 600 dpi and 1200 dpi are available options selectable by the user. Furthermore, "landscape, portrait" associated with "document direction" means that print in the lateral direction and the longitudinal direction of the print medium are available options selectable by the user. "LETTER, A4, B4" associated with "paper size" means that printing on a print medium of Letter size, A4 size and B4 size are available options selectable by the user. The model print condition information 120 can be regarded as information indicating a print condition that a printer of model "AAA" can perform.

Information indicating a data format in which a printer model "AAA" can interpret is registered in the content 118 associated with the interpretable data format information 122. A layout number for specifying layout data, which is described later, is registered in the content 118 associated with the layout data information 124.

Information relating to a printer model having a model name 132 of "BBB" is registered in the model information 130. Similarly to the model information 110, the information registered in the model information 130 includes model print condition information 140, interpretable data format information 142 and layout data information 144. The model print condition information 140 does not include "stapler" or "both-side printing". This means that equipment for the both-side printing or the stapler function cannot be installed in the printer model "BBB". Their numbers of items in a printer model "AAA" are different from a printer model "BBB", and their contents of the items including the available options selectable by the user are also different in both models. Consequently, the available print conditions are different in model "AAA" and model "BBB". FIG. 2 only shows model information 110 and 130 for models "AAA" and "BBB", but model information for various other models such as "CCC" may also be stored in the model information storing area 24.

Printer information for each printer 70 to 90 is stored in the printer information storing area 26. As described below, the memory controlling unit 32 acquires the printer information from each printer 70 to 90 and stores the printer information of each printer 70 to 90 in the printer information storing area 26 (see S606, 608, 616 and 618 in FIG. 5).

(Contents of Printer Information)

As shown in FIG. 3, the printer information 210 is for the first printer 70 with the printer ID "PRI70". The printer information 210 includes a printer ID "PRI70", and a model name "AAA" indicating the model of the first printer 70. The printer information 210 also includes latest print condition information 218 and default print condition information 220.

The latest print condition information 218 indicates a print condition currently available by the first printer 70. An item 214 and a content 216 are associated in the latest print condition information 218. The model of the first printer 70 in the latest print condition information 218 is "AAA".

Consequently, the model information of the first printer 70 in the printer information 210 is identical to that in the model information 110 in FIG. 2.

As shown in FIG. 2, in the model print condition information 120 for model "AAA", the items 114 "both-side printing" and "stapler" are associated with "YES" under option 116. As shown in FIG. 3, in the latest print condition information 218, the item 214 "both-side printing" is associated with the content 216 "available". This means that equipment for the both-side printing is currently installed in the first printer 70 so that the first printer 70 is capable of performing the both-side printing. On the other hand, in the latest print condition information 218, the item 214 "stapler" is associated with the content 216 "not available". This means that equipment for the stapler function is not currently installed in the first printer 70, and that the first printer 70 is not capable of performing the stapler function. Therefore, only the model information 110 may not enough to determine whether or not the first printer 70 is capable of performing the both-side printing and the stapler function.

Furthermore, as shown in FIG. 2, in the model print condition information 120 for the model "AAA", the item 114 "paper size" is associated with the content 118 "LETTER, A4, B4". As shown in FIG. 3, in the latest print condition information 218, the item 214 "paper size" is associated with the content 216 "A4, LETTER". This means that the first printer 70 is able to print onto a print media of Letter, A4 and B4, but that only paper cassettes for papers in Letter size and A4 size are currently installed in the first printer 70, and a paper cassette for papers in B4 size is not installed. Therefore, the first printer 70 is currently capable of printing only onto print media of Letter and A4 sizes. The "A4 available, letter available" associated with the item 214 "number of remaining paper" indicates that print media of A4 size remains in the corresponding paper cassette and that print media of Letter size remain in the corresponding paper cassette.

The print condition in which the first printer 70 is currently capable of printing may vary. For example, if equipment for the stapler function is installed in the first printer 70, the first printer 70 is capable of the stapler function. As described below, the first printer 70 transmits new latest print condition information to the server 10 if the currently available print condition has changed (see S612 in FIG. 5). Upon acquiring new latest print condition information, the server 10 replaces the latest print condition information 218 with the new latest print condition information.

The default print condition information 220 indicates the default print condition currently set in the first printer 70. An item 214 is associated with a content 216 in the default print condition information 220. The default print condition is a print condition previously designated by a user to the first printer 70. That is, unless another print condition is designated when performing printing, the first printer 70 performs printing in accordance with the default print condition.

Printer information for the second printer 80 and printer information for the third printer 90 are also stored in the printer information storing area 26. In the present embodiment, the model of the second printer 80 is "BBB" and the model of the third printer 90 is "CCC".

The layout data storing area 28 stores a plurality of layout data 310, 330 as shown in FIG. 4. One layout data 310, 330 corresponds to one model of printer. Similarly to the model information 110, 130 described above, the memory controlling unit 32 may store in the layout data storing area 28 layout data for respective models acquired from a server, a medium or each printer 70 to 90.

(Contents of Layout Data)

As shown in FIG. 4, the layout data 310, 330 are respectively labelled with the numbers "1" and "2". This number corresponds to a layout data number indicated in the layout data information 124, 144 in the model information 110, 130 in FIG. 2. More specifically, the layout data for a printer model "AAA" is the layout data 310 in FIG. 4. The layout data for a printer of model "BBB" is the layout data 330 in FIG. 4. The layout data storing area 28 also stores layout data for other models such as "CCC".

The layout data 310 for the printer model "AAA" includes default data 312 and position data 318. A character string of item 314 is associated with a box type 316 in the field data 312. The character string of item 314 indicates each item 114 of the model print condition information 120 of the model information 110 for model "AAA". The character string of item 314 also includes a character string "print copies" not included in each item 114 of the model print condition information 120. The box type 316 is information indicating the type of box displayed on a setting screen 500, described below (see FIG. 8). In the present embodiment, there are two types of boxes: a number selection type box and a character string selection type box. The number selection type box is a box for the user to select one or more integer in a predetermined range. The character string selection type box is a box for the user to designate one option from two or more predetermined options. The position data 318 indicates a position on the setting screen 500 of the related default data 312.

Similarly to the layout data 310, the layout data 330 includes field data 332 and position data 338. A character string of item 334 is associated with a box type 336 in the field data 332. The character string of item 334 indicates each item of the model print condition information 140 of the model information 130 for model "BBB". Here, the character strings 334 also include a character string "print copies" not included in each item of the model print condition information 140. Moreover, the character string of item 334 does not include a character string for an item for which two or more options do not exist. For example, "color" in the model print condition information 140 is associated with "monochrome". That is, a printer model "BBB" is only capable of performing monochrome printing. Therefore, the user is not able to designate printing other than in monochrome. A character string for this kind of item is not included in the layout data 330.

(Configuration of Printer)

As shown in FIG. 1, the first printer 70 comprises a controlling unit 72, a print performing unit 78 and a memory 77. A printer program 79 performed by the controlling unit 72 is stored in the memory 77. The controlling unit 72 performs various processes in accordance with a printer program 79 stored in the memory 77. The controlling unit 72 functions as a latest print condition supplying unit 74 and a print data acquiring unit 76 by means of the controlling unit 72 performing processes in accordance with the printer program 79. The print performing unit 78 prints an image represented by print data acquired by the print data acquiring unit 76. The second printer 80 and the third printer 90 have a similar configuration to the first printer 70. As stated above, the printers 70, 80 and 90 are of different models and the available print conditions thereof are different from one another.

(Configuration of PC)

The PC 60 comprises an operating unit 62, a displaying unit 64 and a storage unit. The storage unit stores a browser program 66. The operating unit 62 includes a keyboard and a mouse operated by a user. The controlling unit of the PC 60 is able to cause the displaying unit 64 to display various types of information acquired via the Internet 6, in accordance with the browser program 66.

(Process Performed by Each Device of Network System)

Next, processes performed by the server 10, the PC 60 and the first to third printers 70 to 90 will be described with reference to FIG. 5. The latest print condition supplying unit 74 of the first printer 70 supplies the printer information 604 to the server 10 when a power supply to the first printer 70 is turned on (S602). The printer information 604 includes the printer ID "PRI 70" of the first printer 70, latest print condition information 218, and default print condition information 220 of the first printer 70.

The memory controlling unit 32 of the server 10 acquires the printer information 604 supplied from the first printer 70 (S606). More specifically, the latest print condition information acquiring unit 34 acquires latest print condition information included in the printer information 604, and the default print condition information acquiring unit 35 acquires default print condition information included in the printer information 604. Next, the memory controlling unit 32 stores the printer information 604 acquired in S606 in the printer information storing area 26 (S608). By this means, a printer ID, latest print condition information and default print condition information are stored in mutually associated fashion in the printer information storing area 26. In this case, if printer information including the printer ID acquired in S606 has already been stored in the printer information storing area 26, then the memory controlling unit 32 stores the printer information 604 acquired in S606 in the printer information storing area 26, instead of the previously stored printer information.

As described above, the latest print condition of the first printer 70 may vary. For example, the first printer 70 becomes unable to perform the both-side printing if equipment for the both-side printing is removed (first example). Moreover, the first printer 70 becomes able to perform monochrome printing only, if the color ink or toner for color printing runs out (second example). Furthermore, the first printer 70 becomes unable to print onto a recording medium of A4 size if print media of A4 size in the paper cassette has run out (third example). The latest print condition supplying unit 74 updates the printer information registered in its own memory 77 if the latest print condition of the first printer 70 changes (S610). The latest print condition supplying unit 74 updates the printer information stored therein if the default print condition of the first printer 70 is changed by the user. The latest print condition supplying unit 74 supplies updated printer information 614 to the server 10, each time the printer information in the latest print condition supplying unit 74 is updated (S612). In the first example described above, the latest print condition supplying unit 74 supplies printer information 614 including latest print condition information in which the content associated with "both-side printing" is "not available", to the server 10. In the second example described above, the latest print condition supplying unit 74 supplies printer information 614 including latest print condition information in which the content associated with "color" is "monochrome", to the server 10. In the third example described above, the latest print condition supplying unit 74 supplies printer information 614 including latest print condition information in which the content associated with "number of remaining paper" is "A4 not available, letter available", to the server 10.

The memory controlling unit 32 of the server 10 acquires the printer information 614 supplied from the first printer 70 (S616), similarly to S606. Next, the memory controlling unit 32 stores the printer information 614 acquired in S616 in the printer information storing area 26 (S618). In this case, since the printer ID "PRI70" included in the printer information 604 stored in S608 matches the printer ID "PRI70" included in the printer information 614 acquired in S616, then the memory controlling unit 32 stores the printer information 614 acquired in S616 in the printer information storing area 26 instead of the printer information 604 stored in S608.

Similar process to the process in steps S602 to S618 described above is also carried out between the server 10 and the second printer 80, and between the server 10 and the third printer 90.

By operating the operating unit 62, the user is able to supply a print instruction screen request from the PC 60 to the server 10. Specifically, the user starts up a browser program 66 by operating the operating unit 62. The user then designates a URL of the server 10 by performing an operation in accordance with the browser program 66. As a result of this, the PC 60 supplies a print instruction screen request 620 to the server 10.

The controlling unit 30 of the server 10 supplies print instruction screen data 624 to the PC 60 when the print instruction screen request 620 is acquired (S622). The print instruction screen data 624 is written in a data format in which the browser program 66 can interpret the print instruction screen data, such as HTML (Hyper Text Markup Language) and XML (Extensible Markup Language).

Figure 6:
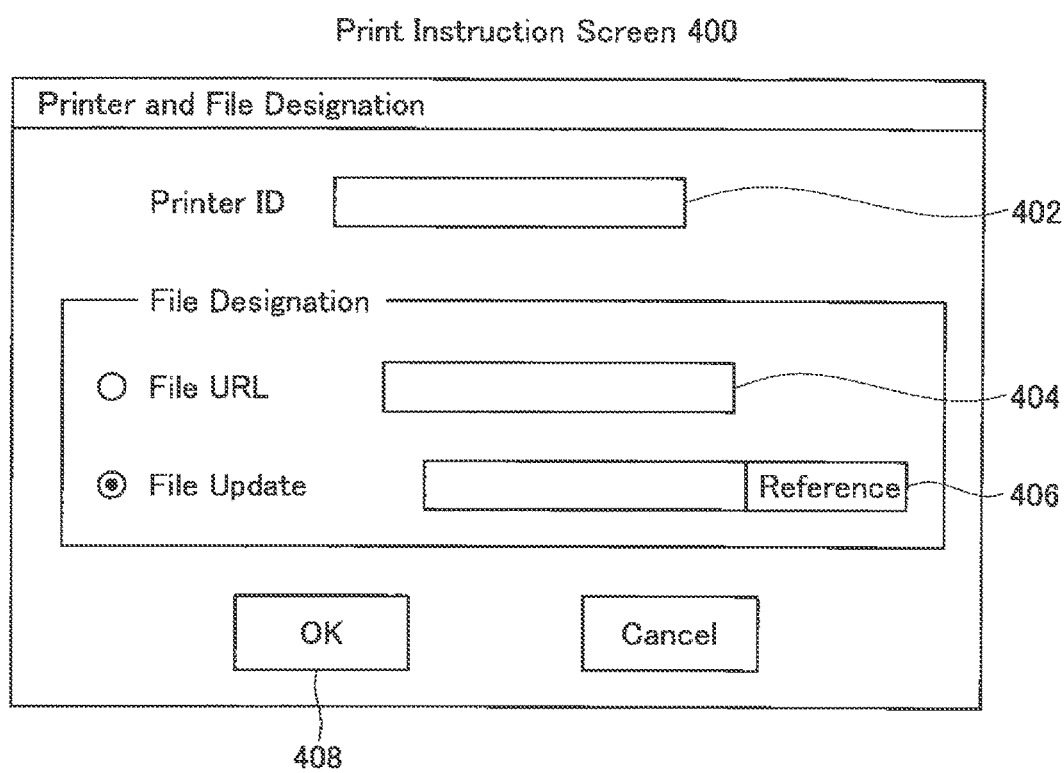
FIG. 6 is a diagram showing one example of a print instruction screen.

The PC 60 causes the displaying unit 64 to display a print instruction screen 400 described in the print instruction screen data 624 acquired from the server 10, in accordance with the browser program 66. As shown in FIG. 6, the print instruction screen 400 includes an area 402 for the user to designate a printer ID and areas 404 and 406 for the user to designate a print target file (e.g., print object file). By operating the operating unit 62, the user is able to designate a printer ID of a printer which should carry out printing. The user is also able to designate a URL of a print target file (e.g., print object file) in the area 404, by operating the operating unit 62. For example, if a file stored in an external server is to be the print target file, then the user inputs the URL of the print target file in the external server, in the area 404. Furthermore, for example, if a file stored in the PC 60 is to be a print target file, then the user inputs the URL of the print target file in the PC 60. When a file stored in the PC 60 is to be the print target file, the user may able to select a reference button in the area 406. In this case, a hierarchical list of folders and files in the PC 60 is displayed and the user is able to choose the print target file from the hierarchical list. In this case, the URL of the print target file, in the PC 60, designated by the user is automatically input to the area 406. After designating the print target file, the user can operate the "OK" button 408.

As shown in FIG. 5, when the user operates the "OK" button 408, the PC 60 supplies a printer ID and file information 626 designated by the user, to the server 10. When the URL has been input to the area 404 by the user, the PC 60 supplies the inputted URL to the server 10 as the file information. On the other hand, if the URL has been input to the area 406, then the PC 60 acquires the print target file in the PC 60 based on the inputted URL. The PC 60 then supplies the acquired print target file to the server 10 as the file information.

The controlling unit 30 acquires the printer ID and the file information 626 supplied from the PC 60 (S628). More specifically, the identification information acquiring unit 36 acquires a printer ID supplied from the PC 60. Furthermore, the target data acquiring unit 38 also acquires file information supplied from the PC 60. If the file information is a URL of the print target file, then in S628, the target data acquiring unit 38 accesses the other server designated by the URL and acquires the file identified by the URL. Furthermore, if the file information is the print target file itself, then in S628, the target data acquiring unit 38 acquires the print target file by acquiring the file information 626 supplied from the PC 60. The generating unit 42 then performs a setting screen data generating process (S630). Subsequently, the screen data supplying unit 40 supplies the generated setting screen data 634 to the PC 60 (S632). The setting screen data 634 is written in a data format in which the browser program 66 can interpret the setting screen data.

(Setting Screen Data Generating Process Performed by Server)

The setting screen data generating process performed in S630 in FIG. 5 is now described with reference to FIG. 7. The creation unit 42 specifies printer information associated with the printer ID acquired in S628 in FIG. 5, from the plurality of printer information 210 stored in the printer information storing area 26. Below, in S628, the description is continued with reference to an example where the printer ID "PRI70" of the first printer 70 has been acquired. Consequently, the printer information 210 of the first printer 70 is specified. Next, the creation unit 42 specifies the content 216 associated with the "printer model name" included in the specified printer information 210 (S702). By this means, the model "AAA" of the first printer 70 is specified.

Next, the creation unit 42 specifies the model information 110 associated with the model name "AAA" specified in S702, from the plurality of model information 110, 130, stored in the model information storing area 24 (S704). Subsequently, the creation unit 42 specifies the layout number "1" associated with "layout data", of the items included in the model information 110 specified in S704. The creation unit 42 specifies the layout data 310 having the specified layout number "1", from the plurality of layout data 310, 330, stored in the layout data storing area 28 (S706). Thereupon, the creation unit 42 compiles layout data using the printer information 210 specified in S702 (S708).

In the process in S708, more specifically, the creation unit 42 compiles field data 312 of the layout data 310 using latest print condition information 218 included in the printer information 210. More specifically, the creation unit 42 deletes items which cannot present an option to the user from the field data 312 based on the respective information in the latest print condition information 218. For example, in the latest print condition information 218, since the item 214 "stapler" and the content 216 "not available" are associated (in other words, since the first printer 70 cannot perform the stapler function), then the creation unit 42 deletes the character string of item "stapler", the box type "character string selection" associated with "stapler" and the position data "fifth line" associated with the "stapler", from the field data 312. In this case, the creation unit 42 changes the "sixth line" in the position data 318 associated with the item 314 "paper size" to "fifth line", and changes the "seventh line" in the position data 318 associated with the item 314 "document direction" to "sixth line". More specifically, the creation unit 42 corrects the position data 318 in such a manner that even if the item "stapler" is removed, a blank does not occur between the other items.

Furthermore, supposing that the item 214 "color" and the content 216 "monochrome" are associated in the latest print condition information 218 (in other words, that the first printer 70 is capable of performing monochrome print only), then the creation unit 42 deletes the item character string "color", the box type "character string selection" and the "second line" from the field data 312. In this case also, the creation unit 42 corrects the position data 318 in such a manner that a blank does not occur between the items.

When S708 has been completed, the creation unit 42 describes options of the print condition that the printer is currently capable of performing, to the layout data 310, for each item of the layout data 310 of the model "AAA" of the first printer 70, using the model information 110 for model "AAA" of the first printer 70 specified in S704 and the printer information 210 of the first printer 70 specified in S702 (S710).

In the process in S710, more specifically, the creation unit 42 firstly specifies one item ("target item" hereinafter), of the plurality of items of the layout data 310. Thereupon, the creation unit 42 specifies the content (e.g., color or monochrome) associated with the target item (e.g., "color"), from the model print condition information 120 of the model information 110. Moreover, the creation unit 42 specifies the content (e.g., color or monochrome) associated with the target item (e.g., "color"), from the latest print condition information 218 of the printer information 210. By this means, the creation unit 42 is able to identify the content of the items available in the model "AAA" of the first printer 70 (e.g., color, monochrome), and the content that the first printer 70 can currently perform (e.g., color, monochrome). At S710, the creation unit 42 performs process for describing contents which can currently be performed by the first printer 70, as optional character strings, of the contents of each item supported by the model "AAA", based on the information specified for each target item.

For example, if the target item is "color", then "color, monochrome" is specified by both the model print condition information 120 of the model information 110 and the latest print condition information 218 of the printer information 210. Consequently, the creation unit 42 is able to tell that the first printer 70 is currently capable of performing both color printing and monochrome printing available in the model "AAA" of the first printer 70. In this case, the creation unit 42 describes "color" and "monochrome" as the optional character string of the box type "character string selection" which is associated with the item "color" in the layout data 310.

Furthermore, for example, if the target item is "both-side printing", then "one side, long side binding, one side binding" is specified from the model print condition information 120 of the model information 110, and "available" is specified from the latest print condition information 218 of the printer information 210. Consequently, the creation unit 42 is able to tell that the first printer 70 is currently capable of performing the both-side printing available in the model "AAA" of the first printer 70. In this case, the creation unit 42 describes "one side, long side binding, one side binding" as the optional character string of the box corresponding to the item "both-side print" in the layout data 310.

Furthermore, for example, if the target item is "paper size", then "letter, A4, B4" is specified from the model print condition information 120 of the model information 110, and "A4, letter" is specified from the latest print condition information 218 of the printer information 210. The creation unit 42 also specifies "A4 available, letter available" which is associated with "number of remaining paper", from the latest print condition information 218 of the printer information 210. By referring to this information, the creation unit 42 is able to determine the sizes "letter, A4" of the print media which can currently be used by the first printer 70, of the sizes "letter, A4, B4" of print media available in the model "AAA" of the first printer 70. In this case, the creation unit 42 describes "letter, A4" as the optional character string corresponding to the box of the item "paper size" in the layout data 310, and does not describe the size "B4" of the recording medium which cannot currently be used by the first printer 70.

Furthermore, for example, if the target item is "document direction", then "landscape, portrait" is specified from the model print condition information 120 in the model information 110. However, there is no item corresponding to "document direction" in the latest print condition information 218 of the printer information 210. In this case, the creation unit 42 describes "landscape, portrait" as the optional character string of the box corresponding to the item "document direction" in the layout data 310.

For example, if the target item is "number of copy", then as shown in FIG. 4, the box type associated with the item "number of copy" is "number selection". In this case, the creation unit 42 describes integers not less than one as the optional character strings of the box corresponding to the item "number of copy" in the layout data 310.

At S710, the creation unit 42 further reads in the default print condition information 220 of the printer information 210. The creation unit 42 arranges the text string of the content indicated by the default print condition information 220 at the start of the optional character strings described for each target item stated above. For example, since the "color" item is set to "color", then the character string "color" of "color, monochrome" which are the options for the "color" item is arranged at the start of the default print condition information 220. By this means, the setting screen 500 (see FIG. 8) is displayed in a state where "color" is stated in the box corresponding to the "color" item. Similarly, the creation unit 42 decides the arrangement of the optional character strings in such a manner that default print conditions are described in the boxes corresponding to the other items.

When S710 ends, the creation unit 42 creates setting screen data having a data format in which the browser program 66 can interpret the setting screen data, using the layout data updated in S706 and S708 (S712). That is, the creation unit 42 creates setting screen data in such a manner that the character strings 314 of the items of the layout data after change (see FIG. 4) and the character strings of the options described in S710 are arranged in the positions (lines) indicated by the position data 318 of the layout data after change.

Figure 7:
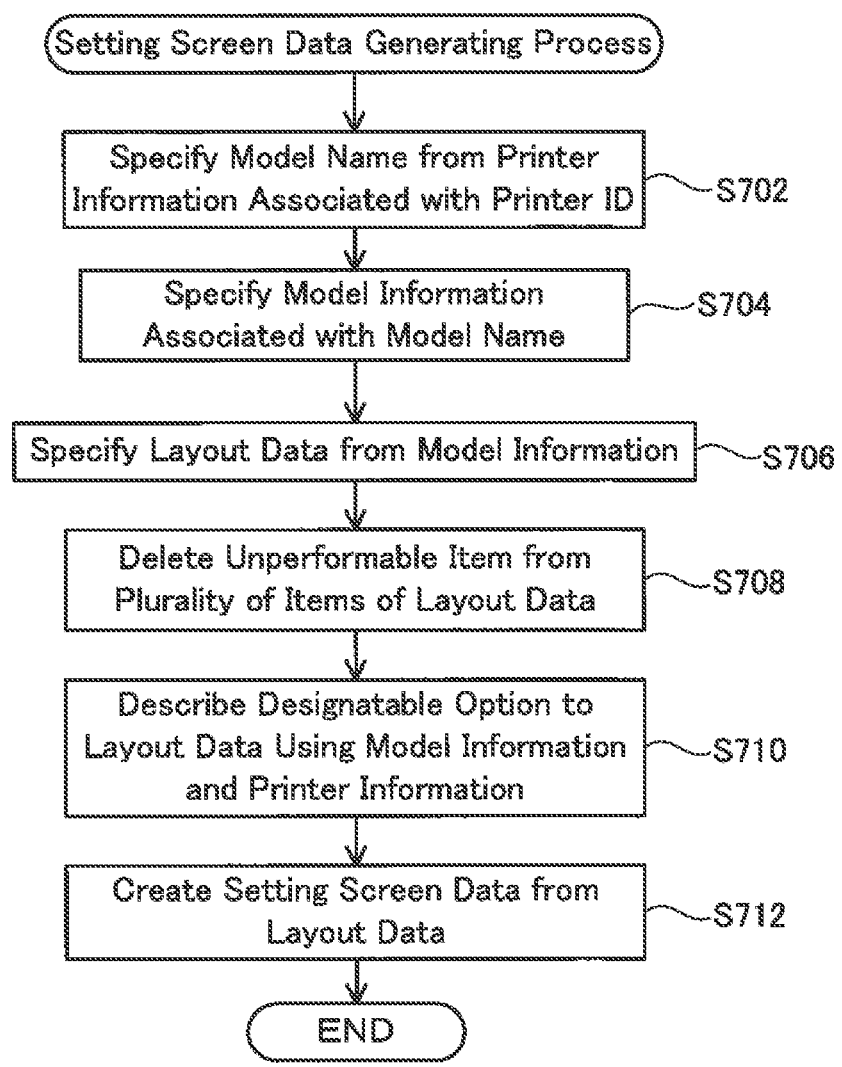
FIG. 7 shows a flowchart of setting screen data generation processing performed by the server.
Figure 8:
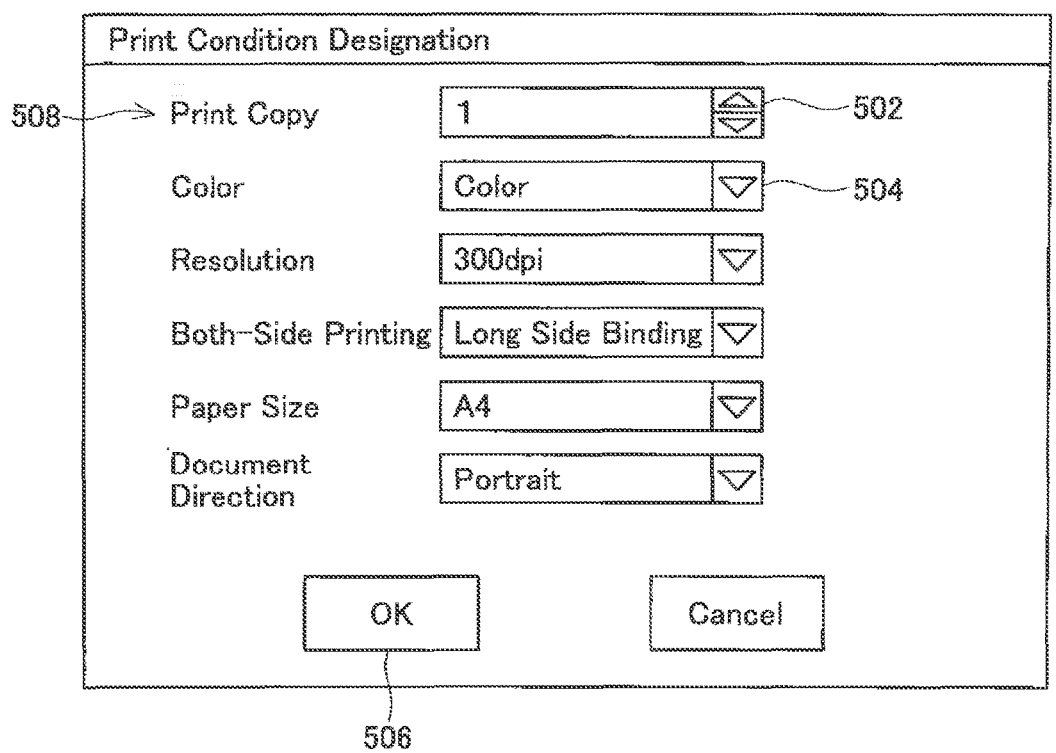
FIG. 8 is a diagram showing one example of a setting screen.

FIG. 8 shows a setting screen 500 displayed by the setting screen data generated in S712. A box 502 for number selection is displayed at a position corresponding to "number of copy" of the setting items 508. The user is able to designate a number of print copies, by operating the buttons of the box 502. Respective boxes 504 for character string selection are displayed at the positions corresponding to the respective items other than "number of copy" in the settings items 508 (e.g., the items "color", "resolution", etc.). In the initial state in which the setting screen 500 is displayed initially on the PC 60, the default print conditions indicated by the default print condition information 220. In other words, the character strings arranged at the start of the option character strings described for each target item, are displayed in each box 504. When the user operates the buttons of the box 504, the list of options described in S710 in FIG. 7 is displayed on the setting screen 500. The user is able to designate one option, via the setting screen 500.

The PC 60 causes the display unit 64 to display the setting screen 500 represented by the setting screen data 634 in accordance with the browser program 66. The user is able to designate the contents of each setting item by operating the operating unit 62. When the "OK" button 506 on the setting screen 500 is operated by the user, the PC 60 supplies setting information 636 to the server 10 as shown in FIG. 5. The setting information 636 includes contents displayed on the setting screen 500 at the time when the "OK" button 506 was operated. The contents are the respective setting items selected by the user.

The setting information acquiring unit 44 acquires setting information 636 supplied from the PC 60 (S638). Next, the print data generating unit 46 generates print data by using the setting information 636 acquired in S638 and the print target file acquired in S628 (S640). More specifically, the print data generating unit 46 firstly specifies the printer information 210 stored in the printer information storing area 26 in association with the printer ID "PRI70" acquired in S628. Thereupon, the print data generating unit 46 specifies the content "AAA" of "printer model name" included in the specified printer information 210. Moreover, the screen data generating unit 46 specifies the model information 110 stored in the model print condition information storing area 24 in accordance with the specified printer model name "AAA". The print data generating unit 46 then specifies the interpretable data format information 122 included in the model information 110. The print data generating unit 46 converts the print target file acquired in S628 into image data having a data format indicated by the interpretable data formation information 122. In the data format the first printer 70 can interpret the image data. The print data generating unit 46 generates print data including the image data generated in S640 and the setting information 636 acquired in S638. Moreover, the print data generating unit 46 stores the generated print data and the printer ID "PRI70" acquired in S628, in mutually associated fashion, in the memory 20. If the print target file acquired in S628 is already in a data format in which the printer can interpret contents of the print target file such as a PDF file, then the print data generating unit 46 does not perform conversion of the data format of the print target file. The print data generating unit 46 generates print data including the print target file acquired in S628 and the setting information 636 acquired in S628.

Each of the printers 70, 80, 90 periodically conduct polling 644, that enquires to the server 10 whether or not data which should be processed by that printer is stored in the server 10. The polling 644 includes the printer ID of the printer which has issued the polling 644. Upon receiving the polling 644, the server 10 judges whether or not print data associated with the printer ID included in the polling 644 is stored in the memory of the server 10. If the result of this judgment process is affirmative, then the server 10 supplies information 646 indicating "job available" (i.e., there is a job), to the printer which issued the polling 644, in response to the polling 644. If the result of this judgment processing is negative, then the server 10 supplies information indicating that there is no job, to the printer which issued the polling 644, in response to the polling 644.

Upon acquiring the information 646 indicating "job available", the printer which issued the polling 644 supplies a job request 648 including its own printer ID to the server 10. On the other hand, if the printer which issued the polling 644 acquires information indicating that there is no job, then a job request 648 is not supplied to the server 10.

Upon acquiring the job request 648, the server 10 supplies the print data associated with the printer ID contained in the job request 648 (namely, print data including the image data generated in S640 and the setting information acquired in S638, this print data 650 having been stored in the memory 20 in S642), to the printer which issued the job request 648 (S649).

Therefore, the print data acquiring unit 76 acquires the print data stored in S642 (S651). The print performing unit 78 performs printing using the print data acquired in S651. More specifically, the print performing unit 78 prints an image represented by the image data acquired in S651, onto a print medium, in accordance with the setting information acquired in S651 (S652).

The present embodiment has been described in detail above. The server 10 generates print data including image data having a format in which the printer can interpret the image data, from the print target file acquired from the PC 60 (S640 in FIG. 5). Therefore, it is possible to achieve printing the print target file, even if a printer driver for generating print data using the print target data is not installed in the PC 60.

The server 10 generates setting screen data using the model information 110, 130, the printer information 210 and the layout data 310, 330, and supplies this setting screen data to the PC 60 (S632 in FIG. 5). The PC 60 is able to display the setting screen 500 by using the supplied setting screen data. A user is able to designate a content of each setting item matching a print condition that a specific printer is capable of performing, via the setting screen 500. The server 10 generates print data by using the contents of each setting item designated by the user and the print target file (S640 in FIG. 5), and supplies the print data to the printer (S649 in FIG. 5). As a result of this, the printer performs printing in accordance with the print data. By means of the configuration described above, it is possible to perform printing corresponding to the content of each setting item designated by the user.

The server 10 acquires printer information when the printer information of the printers 70, 80, 90 has changed (see S616 in FIG. 5). The server 10 stores the acquired printer information in the printer information storing area 26 (see S618 in FIG. 5). Consequently, the server 10 is able to supply setting screen data for designating a content of each setting item matching a print condition that the printers 70, 80, 90 are currently capable of performing, to the PC 60. Therefore, the user is able to designate a content of each setting item matching a print condition that a printer is currently capable of performing.

The server 10 supplies, to the PC 60, setting screen data representing the setting screen 500 which does not include a box for the user to designate the content of each setting item not matching a print condition which can currently be performed by the printer (in the present embodiment, "stapler"). If a user is able to designate a content of each setting item which does not match a print condition that the printer can perform currently, in other words, a content that the printer is currently incapable of performing (e.g., color print), then the user will become dissatisfied because printing is not performed according to that content. According to the present embodiment, it is possible to restrict the occurrence of incidents where the user becomes dissatisfied because the user has designated a content that the printer is incapable of performing and print is not performed in accordance with that content.

The server 10 generates setting screen data including options of each item in the setting screen data generating process (see FIG. 7). As a result of this, it is possible to designate the content of each item by selecting one option from two or more options, via the setting screen 500. The user is able to easily carry out the designation of a print condition.

On the setting screen 500, default print condition information is displayed in the initial state. Therefore, the user is able to designate a print condition while referring to the default print condition information.

The PC 60 is one example of a "terminal device". The model information 110, 130, the printer information 210 and the layout data 310, 330 are examples of "original data". The printer ID is one example of "printer identification information". The item 508 and the boxes 502 and 504 of the setting screen 500 are examples of a "setting field". The model information specified in S704 in FIG. 7 is one example of "specific model information", the latest print condition information included in the printer information specified in S702 in FIG. 7 is one example of "specific latest print condition information", and the default print condition information included in the printer information specified in S702 is one example of "specific default print condition information".

Modification Examples (1) The server 10 may not store the latest print condition information 218 and/or the default print condition information 220, of the printer information 210. In this case, the server 10 may generate setting screen data using the model information 110, etc., and the layout data 310, etc. In other words, in the present modification, the setting screen data does not change in accordance with the latest print condition of each printer, and therefore the setting screen data corresponding to a plurality of printers of the same model is the same.

(2) Instead of that the server 10 deletes, from the layout data 310, an item which cannot be performed currently by the printer, the server 10 may also generate setting screen data in such a manner that items that the printer cannot currently perform are displayed in a different mode to items that the printer can current perform. For example, the server 10 may also generate setting screen data in such a manner that an item which cannot currently be performed by the printer is displayed more faintly than an item which can currently be performed by the printer. In this case also, desirably, the setting screen data is generated in such a manner that the user is able to select the content of an item that the printer cannot currently perform. The setting screen data according to the present modification example is also included in "setting screen data representing a setting screen including a setting field for the user to designate a content of each setting item matching the latest print condition of the printer among all setting items matching the model print condition indicated by the model information, and not including a setting field for the user to designate a content of each setting item not matching the latest print condition of the printer".

(3) The server 10 may also be able to store setting screen data having a data format in which the browser program 66 can interpret the setting screen data. In this example, the setting screen data may be stored for each model of printer. In this case, the server 10 may also supply to the first printer 70 setting screen data corresponding to the model "AAA" of the first printer 70, without modification. Furthermore, the server 10 may also compile setting screen data corresponding to the model "AAA" of the first printer 70, using the printer information 210 of the first printer 70. Alternatively, the server 10 may store setting screen data for designating the content of each setting item of a print condition that the printer is currently capable of performing, for each printer. In this case, the server 10 may also compile setting screen data for each printer if each printer information is acquired from each printer.

(4) In the present embodiment, the layout data for each model is stored in the server 10. However, the layout data may also correspond to printers of a plurality of models. For example, one layout data including both the layout data 310 and the layout data 330 may be provided. In this case, the reference numerals 124 and 144 in FIG. 2 which indicate the number of the layout data may be set to the same number. Furthermore, it is also possible to store just one layout data which is common to all of the models present in the network system 2, in the server 10. This layout data may include all of the items of the print conditions supported by printers of all models which are present in the network system 2. All of the items and the option information of a print condition which can currently be performed by a printer corresponding to the printer ID included in the printer information (e.g., information combining model print condition information 120 and latest print condition information 218) may be included in the items (e.g., the items 214) of the printer information shown in FIG. 3 (e.g., the printer information 210). Moreover, information relating to a data format that can be recognized by the printer corresponding to the printer ID included in the printer information (e.g., interpretable data format information 124) may be included in the printer information. In this case, the server 10 does not have to store model information such as that shown in FIG. 2.

(5) In the present embodiment, respective units 32 to 48 function as a result of the controlling unit 30 performing the processes according to the server program 22. Nevertheless, at least one of respective units 32 to 48 may alternatively be functioned by a hardware resource such as a logic circuit. Furthermore, respective units 74 and 76 are realized as a result of the controlling unit 72 performing the processes according to the printer program 79. Nevertheless, at least one of respective units 74 and 76 may alternatively be functioned by a hardware resource such as a logic circuit.

(6) If the file information is a URL of a print target file and the print target file identified by the URL is stored in the memory 20 of the server 10, the data acquiring unit 38 may acquire the print target file identified by the URL by specifying the print target file from the memory 20.

(7) The print data generating unit 46 may generate print data including the print target file identified the file information 626 acquired from the second device and the setting information 636 acquired from the first device.

(8) The print data generating unit 46 may not generate the print data. For example, the print data generating unit 46 may supply the setting information 636 acquired in S638 and the print target file acquired in S628 to a generating device other than the server 10. The other device may generate the print data by using the setting information 636 and the target file.

Moreover, the technical elements described in the specification and the drawings display technical utility either independently or in various combinations, and are not limited to the combinations stated in the claims in the present application. Furthermore, the technology described as examples in the present specification or drawings achieves a plurality of objects simultaneously, and has technical utility by achieving any one of these objects.

What is claimed is:

1. A non-transitory computer-readable medium comprising computer-readable instructions therein, when executed by a processor of a server, causing the server to perform:

acquiring, from a printer via the Internet, identification information for identifying the printer, condition information indicating at least one paper size among a plurality of paper sizes that the printer is capable of using for printing, and first designated information indicating a first paper size which is designated to the printer;

in response to acquiring the identification information, the condition information, and the first designated information from the printer, storing, in a memory mounted on the server, the condition information and the first designated information in association with the identification information;

in response to acquiring the identification information from an external device via the Internet after the condition information and the first designated information are stored in the memory in association with the identification information, supplying, to the external device via the Internet, first setting screen data generated by using the condition information and the first designated information in association with the identification information acquired from the external device, the first setting screen data being for causing the external device to display a first setting screen, the first setting screen of an initial state indicating the first paper size, the first setting screen allowing via the external device to select one paper size from among the at least one paper size;

after the condition information and the first designated information are stored in the memory in association with the identification information, and after a paper size designated to the printer is changed from the first paper size into a second paper size, acquiring, from the printer via the Internet, the identification information and second designated information indicating the second paper size which is designated to the printer;

in response to acquiring the identification information and the second designated information, storing, in the memory, the second designated information in association with the identification information in place of the stored first designated information;

in response to acquiring the identification information from the external device via the Internet after the second designated information is stored in the memory in association with the identification information, supplying, to the external device via the Internet, second setting screen data generated by using the condition information and the second designated information in association with the identification information acquired from the external device, the second setting screen data being for causing the external device to display a second setting screen, the second setting screen of an initial state indicating the second paper size, the second setting screen allowing via the external device to select one paper size from among the at least one paper size;

after the second setting screen data is supplied to the external device, acquiring, from the external device via the Internet, the identification information, target data representing an image of a print target, and setting information indicating the selected paper size which has been selected on the second setting screen displayed in the external device;

after the setting information, the identification information, and the target data are acquired from the external device, generating print data by using the setting information and the target data;

acquiring, from the printer via the Internet, an acquiring request including the identification information; and in response to acquiring the acquiring request from the printer, supplying, to the printer via the Internet, the print data generated from the target data which has been acquired together with the identification information which is identical to the identification information included in the acquiring request.

2. The non-transitory computer-readable medium as in claim 1, wherein when the printer turns on, the identification information, the condition information, and the first designated information are acquired from the printer via the Internet.

3. The non-transitory computer-readable medium as in claim 1, wherein the condition information further indicates a usable color that the printer is capable of using for printing, the first designated information further indicates a first color which is designated to the printer, and the second designated information further indicates a second color which is designated to the printer.

4. The non-transitory computer-readable medium as in claim 1, wherein the computer-readable instructions, when executed by the processor, cause the server to further perform:

acquiring, from the printer via the Internet, data format information indicating a data format that the printer is capable of interpreting; and in response to acquiring the data format from the printer, storing the data format information in association with the identification information in the memory, after the format information is acquired from the external device, the generating of the print data is performed by further using the data format information.

5. The non-transitory computer-readable medium as in claim 1, wherein the computer-readable instructions, when executed by the processor, cause the server to further perform:

acquiring, from the printer via the Internet when the at least one paper size is changed, the identification information and changed condition information indicating at least one changed paper size; and in response to acquiring the identification information and the changed condition information, storing, in the memory, the changed condition information in association with the identification information in place of the stored condition information.

6. A non-transitory computer-readable medium comprising computer-readable instructions therein, when executed by a processor of a server, causing the server to perform:

acquiring, from a first printer via the Internet, first identification information for identifying the first printer, and first condition information indicating at least one first print condition among a plurality of first print conditions that the first printer is capable of using for printing, the at least one first print condition including a specific print condition;

in response to acquiring the first identification information and the first condition information from the first printer, storing, in a memory mounted on the server, the first condition information in association with the first identification information;

acquiring, from a second printer via the Internet, second identification information for identifying the second printer, and second condition information indicating at least one second print condition among a plurality of second print conditions that the second printer is capable of using for printing, the at least one second print condition not including the specific print condition;

in response to acquiring the second identification information and the second condition information from the second printer, storing, in the memory mounted on the server, the second condition information in association with the second identification information;

after the first condition information is stored in the memory in association with the first identification information, and the second condition information is stored in the memory in association with the second identification information, in response to acquiring the first identification information from an external device via the Internet, supplying, to the external device via the Internet, first setting screen data generated by using the first condition information in association with the first identification information acquired from the external device, the first setting screen data being for causing the external device to display a first setting screen, the first setting screen indicating the at least one first print condition including the specific print condition, the first setting screen allowing a selection of a print condition from among the at least one first print condition including the specific print condition;

in response to acquiring the second identification information from the external device via the Internet, supplying, to the external device via the Internet, second setting screen data generated by using the second condition information in association with the second identification information acquired from the external device, the second setting screen data being for causing the external device to display a second setting screen, the second setting screen indicating the at least one second print condition not including the specific print condition, the second setting screen allowing a selection of a print condition from among the at least one second print condition not including the specific print condition;

after at least one of the first setting screen data and the second setting screen data is supplied to the external device, acquiring, from the external device via the Internet, the first or second identification information, target data representing an image of a print target, setting information indicating the selected print condition;

after the setting information, the first or second identification information, and the target data are acquired from the external device, generating print data by using the setting information and the target data;

after the print data is stored in the memory, acquiring, from the printer via the Internet, an acquiring request including the first or second identification information; and in response to acquiring the acquiring request from the printer, supplying, to the printer via the Internet, the print data generated from the target data which has been acquired together with the first or second identification information which is identical to the first or second identification information included in the acquiring request.

7. The non-transitory computer-readable medium as in claim 6, wherein
the specific print condition includes a specific setting item,
the first setting screen data is for causing the external device to display the first setting screen indicating the at least one first print condition including the specific setting item, and
the second setting screen data is for causing the external device to display the second setting screen indicating the at least one second print condition not including the specific setting item.

8. The non-transitory computer-readable medium as in claim 7, wherein a number of items included in the first setting screen is different from a number of items included in the second setting screen.

9. The non-transitory computer-readable medium as in claim 7, wherein
the first setting screen includes a specific setting field for designating a setting content corresponding to the specific setting item, and
the second setting screen does not include the specific setting field.

10. The non-transitory computer-readable medium as in claim 6, wherein
the specific print condition includes setting contents corresponding to a specific setting item,
the first setting screen data is for causing the external device to display the first setting screen indicating the at least one first print condition including the setting contents corresponding to the specific setting item, and
the second setting screen data is for causing the external device to display the second setting screen indicating the at least one second print condition not including the setting contents corresponding to the specific setting item.

11. The non-transitory computer-readable medium as in claim 6, wherein
the computer-readable instructions, when executed by the processor, cause the server to further perform:
acquiring, from the second printer via the Internet when the at least one second print condition is changed to at least one third print condition in the second printer, the second identification information and third condition information indicating the at least one third print condition, the at least one third print condition including the specific print condition;
in response to acquiring the second identification information and the third condition information, storing, in the memory, the third condition information in association with the second identification information in place of the second condition information; and
in response to acquiring the second identification information from the external device via the Internet after the third condition information is stored in the memory in association with the second identification information, supplying, to the external device via the Internet, third setting screen data generated by using the third condition information in association with the second identification information acquired from the external device, the third setting screen data being for causing the external device to display a third setting screen, the third setting screen indicating the at least one third print condition including the specific print condition, the third setting screen allowing a selection of a print condition from among the at least one third print condition including the specific print condition.

12. A server comprising:
a processor; and
a memory storing computer-readable instructions,
wherein the computer-readable instructions, when executed by the processor, cause the server to perform:
acquiring, from a printer via the Internet, identification information for identifying the printer, condition information indicating at least one paper size among a plurality of paper sizes that the printer is capable of using for printing, and first designated information indicating a first paper size which is designated to the printer;
in response to acquiring the identification information, the condition information, and the first designated information from the printer, storing, in a memory mounted on the server, the condition information and the first designated information in association with the identification information;
in response to acquiring the identification information from an external device via the Internet after the condition information and the first designated information are stored in the memory in association with the identification information, supplying, to the external device via the Internet, first setting screen data generated by using the condition information and the first designated information in association with the identification information acquired from the external device, the first setting screen data being for causing the external device to display a first setting screen, the first setting screen of an initial state indicating the first paper size, the first setting screen allowing via the external device to select one paper size from among the at least one paper size;
after the condition information and the first designated information are stored in the memory in association with the identification information, and after a paper size designated to the printer is changed from the first paper size into a second paper size, acquiring, from the printer via the Internet, the identification information and second designated information indicating the second paper size which is designated to the printer;
in response to acquiring the identification information and the second designated information, storing, in the memory, the second designated information in association with the identification information in place of the stored first designated information;
in response to acquiring the identification information from the external device via the Internet after the second designated information is stored in the memory in association with the identification information, supplying, to the external device via the Internet, second setting screen data generated by using the condition information and the second designated information in association with the identification information acquired from the external device, the second setting screen data being for causing the external device to display a second setting screen, the second setting screen of an initial state indicating the second paper size, the second setting screen allowing via the external device to select one paper size from among the at least one paper size;
after the second setting screen data is supplied to the external device, acquiring, from the external device via the Internet, the identification information, target data representing an image of a print target, and setting information indicating the selected paper size which has been selected on the second setting screen displayed in the external device;

after the setting information, the identification information, and the target data are acquired from the external device, generating print data by using the setting information and the target data;

acquiring, from the printer via the Internet, an acquiring request including the identification information; and in response to acquiring the acquiring request from the printer, supplying, to the printer via the Internet, the print data generated from the target data which has been acquired together with the identification information which is identical to the identification information included in the acquiring request.

13. The server as in claim 12, wherein
when the printer turns on, the identification information, the condition information, and the first designated information are acquired from the printer via the Internet.

14. The server as in claim 12, wherein
the condition information further indicates a usable color that the printer is capable of using for printing,
the first designated information further indicates a first color which is designated to the printer, and
the second designated information further indicates a second color which is designated to the printer.

15. The server as in claim 12, wherein
the computer-readable instructions, when executed by the processor, cause the server to further perform:
acquiring, from the printer via the Internet, data format information indicating a data format that the printer is capable of interpreting; and
in response to acquiring the data format from the printer, storing the data format information in association with the identification information in the memory,
after the format information is acquired from the external device, the generating of the print data is performed by further using the data format information.

16. The server as in claim 12, wherein
the computer-readable instructions, when executed by the processor, cause the server to further perform:
acquiring, from the printer via the Internet when the at least one paper size is changed, the identification information and changed condition information indicating at least one changed paper size; and
in response to acquiring the identification information and the changed condition information, storing, in the memory, the changed condition information in association with the identification information in place of the stored condition information.

17. A server comprising:
a processor; and
a memory storing computer-readable instructions,
wherein the computer-readable instructions, when executed by the processor, cause the server to perform:
acquiring, from a first printer via the Internet, first identification information for identifying the first printer, and first condition information indicating at least one first print condition among a plurality of first print conditions that the first printer is capable of using for printing, the at least one first print condition including a specific print condition;
in response to acquiring the first identification information and the first condition information from the first printer, storing, in a memory mounted on the server, the first condition information in association with the first identification information;
acquiring, from a second printer via the Internet, second identification information for identifying the second printer, and second condition information indicating at least one second print condition among a plurality of second print conditions that the second printer is capable of using for printing, the at least one second print condition not including the specific print condition;
in response to acquiring the second identification information and the second condition information from the second printer, storing, in the memory mounted on the server, the second condition information in association with the second identification information;
after the first condition information is stored in the memory in association with the first identification information, and the second condition information is stored in the memory in association with the second identification information,
in response to acquiring the first identification information from an external device via the Internet, supplying, to the external device via the Internet, first setting screen data generated by using the first condition information in association with the first identification information acquired from the external device, the first setting screen data being for causing the external device to display a first setting screen, the first setting screen indicating the at least one first print condition including the specific print condition, the first setting screen allowing a selection of a print condition from among the at least one first print condition including the specific print condition;
in response to acquiring the second identification information from the external device via the Internet, supplying, to the external device via the Internet, second setting screen data generated by using the second condition information in association with the second identification information acquired from the external device, the second setting screen data being for causing the external device to display a second setting screen, the second setting screen indicating the at least one second print condition not including the specific print condition, the second setting screen allowing a selection of a print condition from among the at least one second print condition not including the specific print condition;
after at least one of the first setting screen data and the second setting screen data is supplied to the external device, acquiring, from the external device via the Internet, the first or second identification information, target data representing an image of a print target, setting information indicating the selected print condition;
after the setting information, the first or second identification information, and the target data are acquired from the external device, generating print data by using the setting information and the target data;
after the print data is stored in the memory, acquiring, from the printer via the Internet, an acquiring request including the first or second identification information; and
in response to acquiring the acquiring request from the printer, supplying, to the printer via the Internet, the print data generated from the target data which has been acquired together with the first or second identification information which is identical to the first or second identification information included in the acquiring request.

18. The server as in claim 17, wherein
the specific print condition includes a specific setting item,
the first setting screen data is for causing the external device to display the first setting screen indicating the at least one first print condition including the specific setting item, and
the second setting screen data is for causing the external device to display the second setting screen indicating the at least one second print condition not including the specific setting item.

19. The server as in claim 18, wherein
a number of items included in the first setting screen is different from a number of items included in the second setting screen.

20. The server as in claim 18, wherein
the first setting screen includes a specific setting field for designating a setting content corresponding to the specific setting item, and
the second setting screen does not include the specific setting field.

21. The server as in claim 17, wherein
the specific print condition includes setting contents corresponding to a specific setting item,
the first setting screen data is for causing the external device to display the first setting screen indicating the at least one first print condition including the setting contents corresponding to the specific setting item, and
the second setting screen data is for causing the external device to display the second setting screen indicating the at least one second print condition not including the setting contents corresponding to the specific setting item.

22. The server as in claim 17, wherein
the computer-readable instructions, when executed by the processor, cause the server to further perform:
acquiring, from the second printer via the Internet when the at least one second print condition is changed to at least one third print condition in the second printer, the second identification information and third condition information indicating the at least one third print condition, the at least one third print condition including the specific print condition;
in response to acquiring the second identification information and the third condition information, storing, in the memory, the third condition information in association with the second identification information in place of the second condition information; and
in response to acquiring the second identification information from the external device via the Internet after the third condition information is stored in the memory in association with the second identification information, supplying, to the external device via the Internet, third setting screen data generated by using the third condition information in association with the second identification information acquired from the external device, the third setting screen data being for causing the external device to display a third setting screen, the third setting screen indicating the at least one third print condition including the specific print condition, the third setting screen allowing a selection of a print condition from among the at least one third print condition including the specific print condition.

* * * * *